United States Patent [19]

Trelc

[11] 3,848,522

[45] Nov. 19, 1974

[54] ROTISSERIE SPIT MOUNTING MEANS

[75] Inventor: William F. Trelc, Boonville, Mo.

[73] Assignee: McGraw-Edison Company, Elgin, Ill.

[22] Filed: July 10, 1972

[21] Appl. No.: 270,445

[52] U.S. Cl.................... 99/421 H, 99/340, 99/450
[51] Int. Cl. ........................................... A47j 37/04
[58] Field of Search ............ 99/421, 339, 340, 419, 99/420, 450; 30/322, 323; 64/4, 23; 192/67, 192/95, 108; 294/27-28, 29-30, 31

[56] References Cited
UNITED STATES PATENTS

| | | | |
|---|---|---|---|
| 2,555,593 | 6/1951 | Lee | 192/95 UX |
| 2,702,098 | 2/1955 | Staak | 192/95 X |
| 2,821,905 | 2/1958 | Culligan | 99/421 H |
| 3,704,141 | 11/1972 | Grossman | 99/450 |

*Primary Examiner*—Harvey C. Hornsby
*Assistant Examiner*—Arthur O. Henderson

[57] ABSTRACT

A mounting means for a rotisserie spit, including spaced bearing supports adjacent the ends of the spit upon which the spit can be lowered to and supported on, a spit drive adjacent one end of the spit axially movable for engagement with and disengagement from the spit after the spit is on and independently of positioning the spit on the bearing supports, and a separate tool to carry the spit and locate the same relative to the bearing supports.

8 Claims, 5 Drawing Figures

PATENTED NOV 19 1974 3,848,522
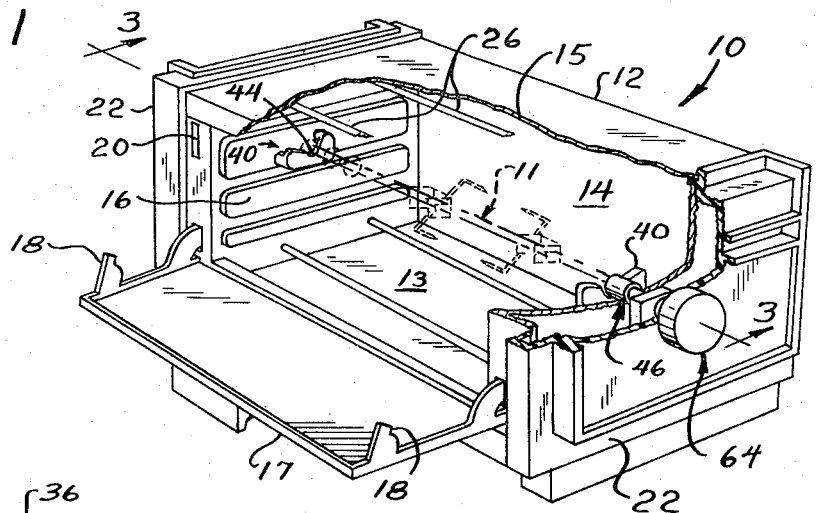
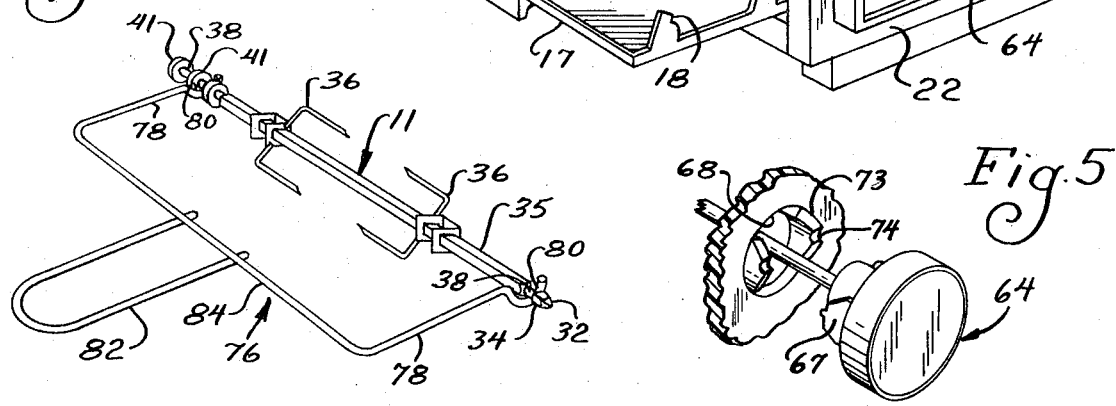
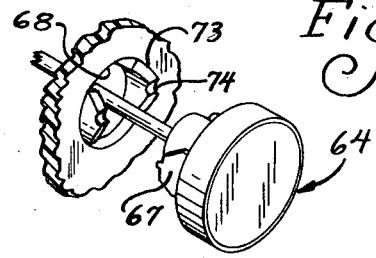
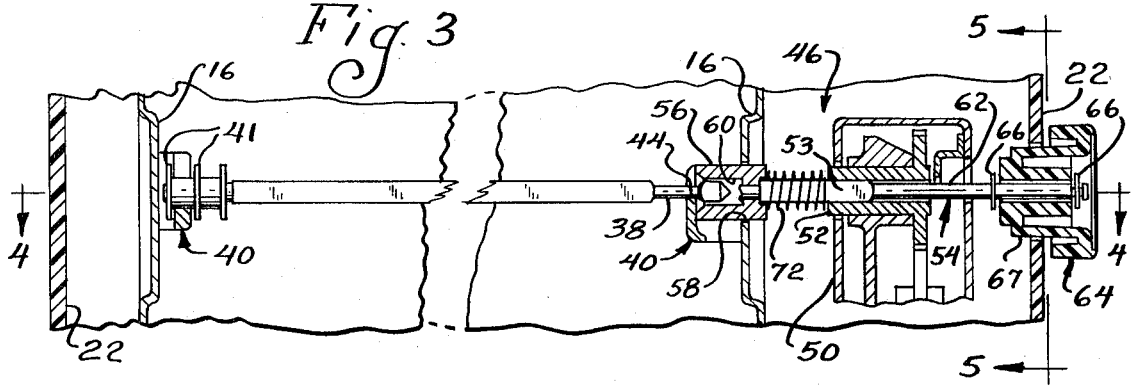
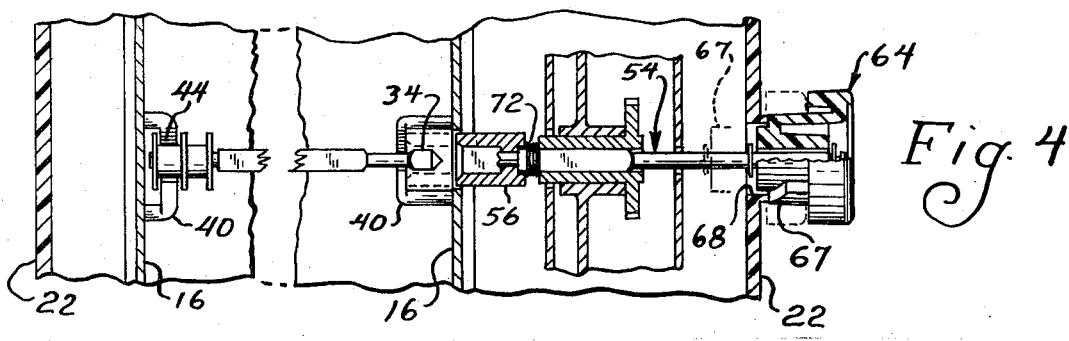

ROTISSERIE SPIT MOUNTING MEANS

Any product to be rotisserie broiled can be held on an elongated spit by holding barbs or in a basket, and the spit can then be rotated in adjacent proximity to a heat source of either burning coal or gas or glowing electrical heating elements. Spit mounting means must therefor be provided for supporting the spit, typically on a horizontal axis, and for rotating the spit about its axis.

This invention relates to, and an object of the invention is to provide, a spit mounting means which allows for the easy loading and unloading of the spit and independently thereof which allows for the easy engagement and release of the spit drive means with the spit. Specifically, this invention provides a mounting having a pair of brackets against which the ends of the spit are supported and an axially moving drive coupling located adjacent and axially aligned with one spit end as supported on the brackets and remotely located manual control for moving the coupling between non-driving and telescoped driving relation with the spit end. Moreover, a separate tool is provided which can be used to carry the spit for loading and unloading same relative to the brackets.

The invention will be more fully understood and appreciated after referring to the following specification, the accompanying drawing forming a part thereof, wherein:

FIG. 1 is a perspective view, partly broken away for clarity of disclosure, of a table model electric broiler having a preferred embodiment of the subject spit mounting means disclosed therein;

FIG. 2 is a perspective view, taken generally along the same angle as FIG. 1, of a spit and a carrying tool therefor for use according to the subject invention;

FIG. 3 is a sectional view, as seen generally from line 3—3 in FIG. 1, showing the spit mounting arrangement and drive therefor:

FIG. 4 is a sectional view, as seen generally from 4—4 in FIG. 3, except showing the drive in the non-engaged position; and, FIG. 5 is a perspective view of the case adjacent the spit drive as seen in the direction of sight line 5—5.

Referring to FIG. 1, a table model electric broiler 10 is shown having a spit 11 (phantom only) mounted therein according to the disclosed invention. The broiler sheet metal case 12 comprises a base wall 13, a rear well 14, a top wall 15 and opposed inner end walls 16, where the front is open providing access to the case interior. A door 17 is mounted to pivot between an open position shown and a closed position (not shown) where the door would be generally parallel to the rear wall 14 and door latches 18 engaged in case openings 20. End pedestals 22 of a heat insulating material, such as phoenalic, secured to the case 12 act as handles and also hold the case off the supporting surface.

Upper heating elements 26 are mounted in spaced adjacent relation to the top wall 15 and lower heating elements 28 are mounted adjacent the base wall 13. Appropriate electrical connections including thermostatic controls or the like (not shown) are made to the upper and/or lower heating elements to give the required controlled heat input to the unit.

The spit 11 is typically of metal and is shorter than the distance between the end walls 16 to allow placement in the case without interference from the end walls. The pointed spit end 32 is suited for piercing the particular product to be broiled, while the otherwise square cross section keying tip 34 and center span 35 provides for easy keying to the drive and with a pair of product holding barbs 36 of typical construction. Round spit sections 38 are provided for riding on bearing brackets 40 connected to the end walls 16, and spacer rings 41 straddling one bracket limit allowable axial movement of the spit relative to the case.

Each bracket is stationary and has its ends connected to the interior wall 16 and an inwardly spaced connecting horizontal section shaped with a upwardly open concave trough 44 for support of the spit bearing areas 36. In this manner, the spit can be easily placed in or removed from support pieces 40 with and upon vertical spit movement, and as supported, the spit can be rotated while the spacer rings 41 preclude axial spit movement.

The spit drive 46 includes a typical motor and gear reduction unit 50 supported in the case between the end pedestal 22 and end wall 16. The drive unit 50 has a output socket 52 that is rotated at some low speed, such as 5 rpm, suitable for broiling. The socket 52 is hollow having a square bore that receives the square part 53 of drive shaft 54, the shaft thus being rotatably keyed to the socket 52 but axially movable therein. A coupling 56 is secured to the inboard end of the shaft 54 and the same is of circular exterior cross section to fit freely through opening 58 in the case end wall 16. The coupling has a square bore 60 sized to receive and become rotatably keyed to the square spit cross section 34.

The output shaft end 62 is of circular cross section and fits within and rotatably supports control knob 64 although the knob is constrained axially thereon between snap springs 66 received in grooves on the shaft. The control knob 64 has a rectangular nose 67 that fits opening 68 on the end pedestal 22 and allows for controlled movement of the shaft from outside the case.

When the knob nose is lined up with the elongation of the case opening (FIG. 3 and phantom only in FIG. 4), it is received in the opening and the drive coupling 56 is extended through the wall opening 68 and is then in position to be rotatably keyed to the spit. A compression spring 72 between the drive socket 52 and coupling 56 biases the shaft and coupling to this engaged position.

The control knob 64 can be withdrawn against the compression of spring 72 from within the opening and rotated 90° (as shown in FIG. 4) where the knob nose transverses narrowed ridges 73 defining the casing opening and holds the control knob in this position, and the coupling 56 in a retracted position out of drive engagement with the spit 30. With the drive coupling in this retracted position, the spit can be easily placed in or removed from the case supports. To assist the axial shifting of the control knob, the side edges of the nose can be tapered from a high center part and the ridges likewise shaped to define axial camming action upon 90° knob rotation. Cooperating detent recess means 74 on the end pedestal receives the control knob to releasably hold it and the drive shaft in a retracted position.

The disclosed spit mounting arrangement is suited for use in any broiler arrangement but is particularly suited for high cost or quality domestic broilers where appearance and convenience are important. In this regard, the case end wall need not have the customary front open spit receiving slot, which greatly improves the unit appearance and the ease of cleaning appliance. The drive coupling movement can be safely controlled by the exterior control knob 64. Moreover, the spit can be easily handled with an accessory tool 76 provided with both safety and convenience, particularly for removing the hot cooked product from the hot broiler.

The separate tool 76 has parallel arms 78 separated by less than the distance between the case end walls 16 and the ends of the arms have upwardly concave recesses 80 adapted to engage the round areas 38 on the spit. A loop 82 secured as by welding to the connecting section 84 between the arms forms a gripping spot for one hand carrying of the tool 76 and manipulation thereby of the spit 30.

What is claimed is:

1. For use in a broiler have spaced stationary end walls, a spit mounting arrangement comprising the combination of a spit of length less than the spacing between the end walls, opposed supports inwardly spaced from the end walls and defining thereon concave trough sections adapted to receive and support the spit near the opposite ends thereof, rotatable power means located adjacent but axially spaced from and aligned with one spit end as the spit is on the supports, a shaft rotatably keyed to the power means and axially movable relative thereto between axially spaced operative positions, a drive coupling on the shaft adapted to become rotatably keyed with the adjacent one spit end in one operative shaft position and to be separated from said spit end in a second operative position, a control element on the shaft exposed on the side of the end wall remote from the spit, the control element being axially keyed to the shaft but being free to rotate relative to the shaft, and faces on the control element and adjacent end wall engaged upon partial rotation of the control element on the shaft relative to the end wall to releasibly lock the control element in the second operative position where the coupling and spit are separated.

2. A combination as claimed in claim 1, further including a tool for carrying the spit for positioning on and removal from the supports, said tool including a central grip portion and a pair of arms spaced apart less than the length of the spit and the distance between the supports, and concave troughs on the free ends of the arms adapted to register with the spit for lifting support thereof.

3. A combination according to claim 1, wherein a coil compression spring is disposed around the shaft between the coupling and the drive means for biasing the coupling toward the one operative position where the drive coupling and spit are rotatably keyed.

4. A combination according to claim 3, wherein the support trough sections open concavely upward, and further including a tool for carrying the spit for positioning on and removal from the supports, said tool including a central grip portion and a pair of arms separated by a distance slightly less than the distance between the supports adapted to fit adjacent the opposite ends of the spit, and an upwardly facing concave trough on the free ends of arms adapted for supporting the spit.

5. A combination according to claim 1, wherein the cooperating faces of the control element and end wall have portions that slope axially of the spit and cam the control element axially upon control element rotation.

6. For use in a broiler having spaced stationary end walls, a spit mounting arrangement comprising the combination of a spit of length less than the spacing between the end walls, opposed supports inwardly spaced from the end walls adapted to engage and support the spit near the opposite ends thereof, rotatable power means located adjacent but axially spaced from and aligned with one spit end as the spit is on the supports and on the side of the adjacent end wall remote from the spit, a shaft rotatably keyed to the power means and axially movable relative thereto and through an opening in the last mentioned end wall between axially spaced operative positions, coupling means between the shaft and spit adapted in one operative shaft position to rotatably key them together and adapted in a second operative shaft position to release the rotatable keying, means urging the shaft to the one operatiive position, a control element exposed on the side of the last mentioned end wall remote from the spit, said control element being rotatably mounted to the shaft but being axially keyed relative to the shaft, and means between the control element and end wall for axially moving the shaft between the operative positions and for holding the shaft in the second operative shaft position responsive to axial and rotational manipulation of the control element.

7. A combination according to claim 6, wherein detent faces on the control element and adjacent end wall are engaged upon said manipulation of the control element to releasibly lock the control element and shaft in the second operative shaft position.

8. A combination according to claim 6, wherein means cooperate between the spit and the opposed supports operable to allow rotation of the spit but to limit axial spit movement.

* * * * *